T. G. THOMAS.
TRUCK.
APPLICATION FILED NOV. 17, 1919.

1,345,564.

Patented July 6, 1920.
2 SHEETS—SHEET 1.

Inventor:
Theodore G. Thomas.
By H. G. Fletcher
att.

T. G. THOMAS.
TRUCK.
APPLICATION FILED NOV. 17, 1919.

1,345,564.

Patented July 6, 1920.
2 SHEETS—SHEET 2.

Inventor:
Theodore G. Thomas.
By L. G. Fletcher
atty.

UNITED STATES PATENT OFFICE.

THEODORE G. THOMAS, OF HOUSTON, TEXAS.

TRUCK.

1,345,564.  Specification of Letters Patent.  Patented July 6, 1920.

Application filed November 17, 1919. Serial No. 338,629.

*To all whom it may concern:*

Be it known that I, THEODORE G. THOMAS, a citizen of the United States of America, and a resident of the city of Houston, in the county of Harris and State of Texas, have invented certain new and useful Improvements in Trucks, of which the following is a specification.

The primary object of this invention is to provide an improvement in trucks of the character used around depots, warehouses, factories and the like, for loading and unloading heavy packages to and from a vehicle.

Another object of the invention is to provide an improvement in a hand propelled truck in which the platform thereof can be elevated and lowered by the actuation of the handle which is used for propelling the truck.

Other and further objects will appear in the specification and be specifically pointed out in the appended claims, reference being had to the accompanying drawings exemplifying the invention, and in which, Figure 1 is a side elevation of this improved truck showing the elevating platform in lowered position.

Figure 1:
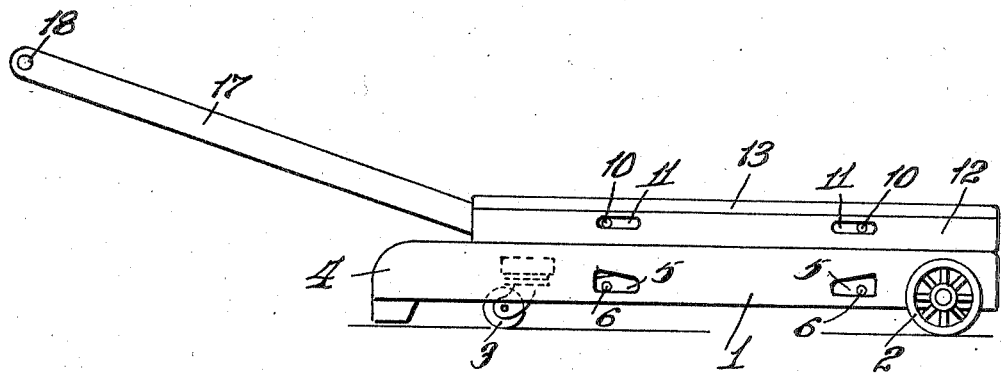
Figure 2:
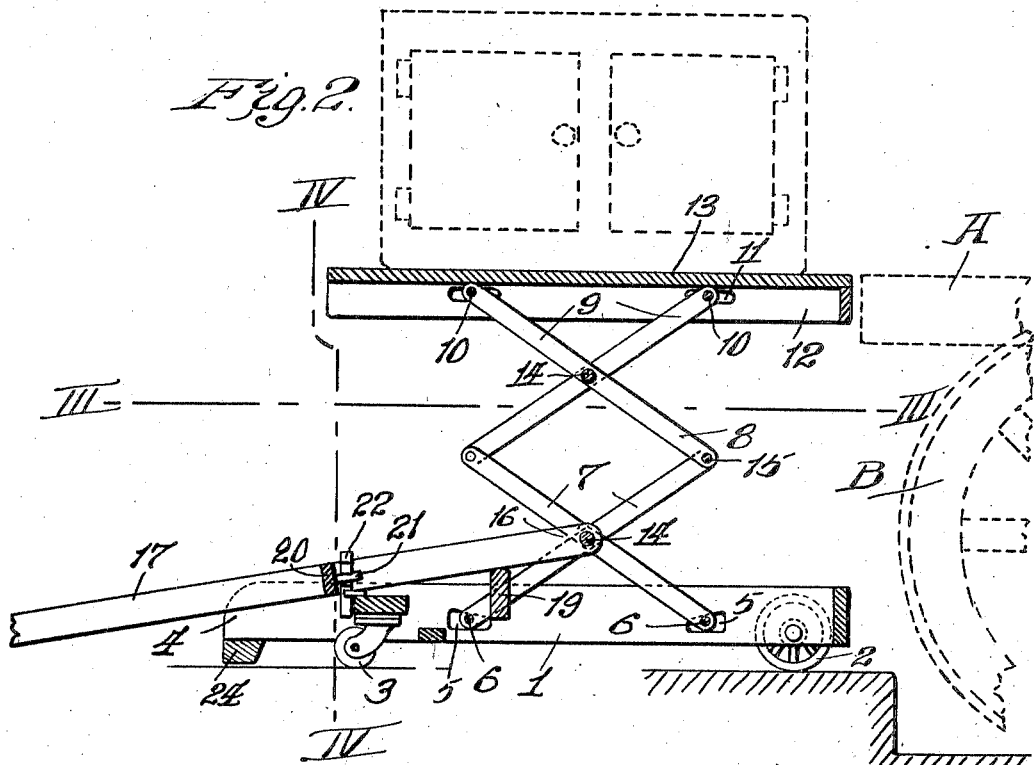
Fig. 2 is a longitudinal section of the truck showing the platform thereof elevated.
Figure 3:
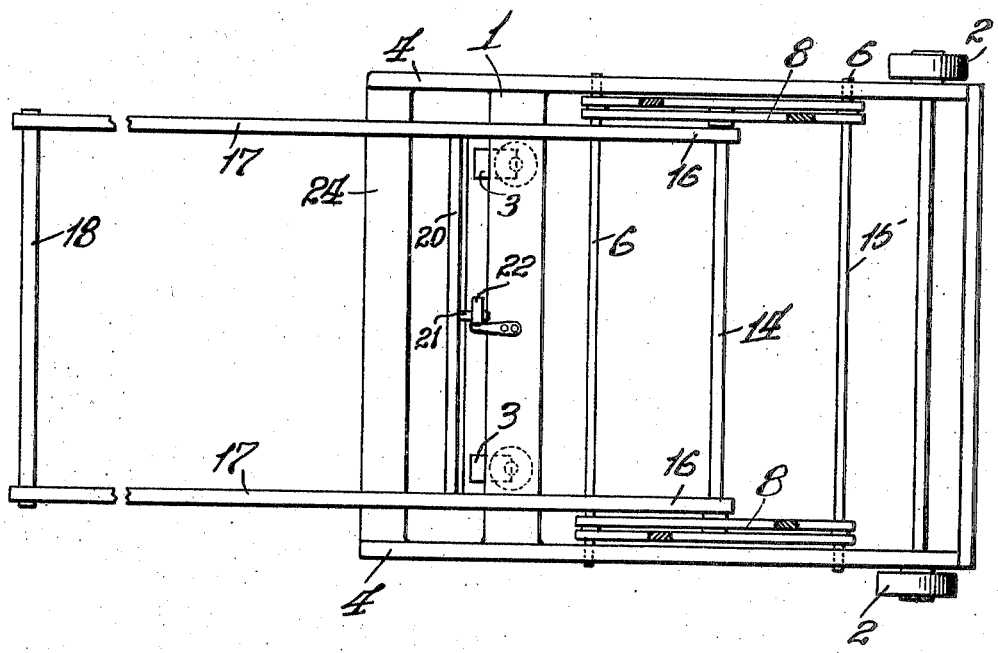
Fig. 3 is a horizontal section taken on the line III—III of Fig. 2.
Figure 4:
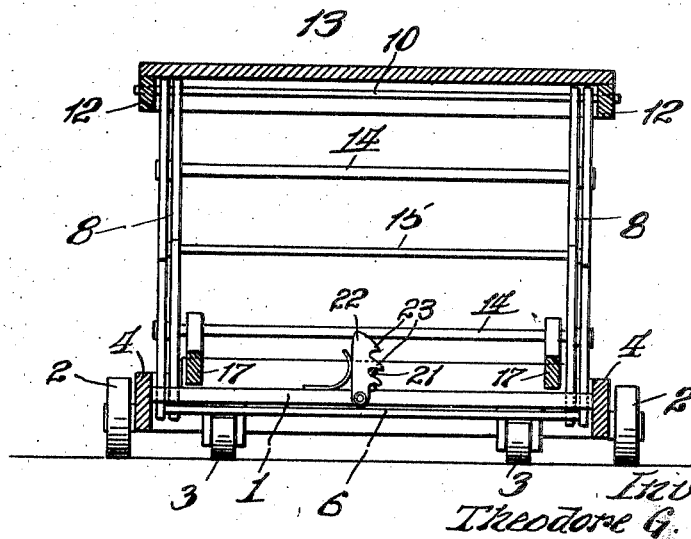
Fig. 4 is a transverse section taken on the line IV—IV of Fig. 2.

Referring to the accompanying drawings, 1 designates the base portion of the truck having a pair of forwardly arranged rollers or wheels 2 and the rearwardly arranged swivel rollers 3 secured thereto. The base portion 1 has a pair of side members 4, and formed in each of said side members is a pair of slots 5, each pair of slots of each member 4 being in opposing disposition. Engaged in each opposing set of slots are the ends of horizontally arranged bars 6, and swingingly secured to said bars are the lower members 7 of a pair of lazy tong mechanisms 8, the upper arranged members 9 of said lazy tong mechanisms being in swinging engagement with a pair of upper arranged cross bars 10, the ends of which are engaged in slots 11 that are formed in the side members 12 of the platform 13.

The pair of lazy tong mechanisms 8 are tied together by centrally arranged cross members 14 and outer arranged cross members 15, and pivotally mounted to the lower one of said centrally arranged cross members 14 are the ends 16 of a pair of propelling shafts 17, said shafts bearing a manipulating handle 18. Transversely arranged between the side members 4 of the base portion 1 is a beam 19 on which rests the shafts 17, and arranged between said shafts and carried thereby is a member 20 bearing an engaging member 21.

Centrally arranged between the shafts 17 and pivotally secured to the base portion 1 and extending upwardly therefrom is a spring actuated ratchet pawl 22, bearing a plurality of teeth 23, said teeth being for engagement with the engaging member 21.

In the operation of this improved truck, the truck is moved from place to place by pushing or pulling on the handle in the usual way, in which the pushing or pulling strain will be given to the lowermost cross member 14 through the lower arranged members 7 of the lazy tong mechanisms to the base portion 1. Assuming heavy objects are to be placed on to the platform 13 of the truck from the floor, the platform is lowered to the position shown in Fig. 1, in which the side members 12 of the platform 13 will rest on the side members 4 of the base portion 1. When the platform has been loaded, the truck is then moved with the load thereon to the place where the goods are to be deposited, which for instance may be the platform A of the truck B. Downward pressure is then brought to bear on the handle 18 of the shafts 17, and inasmuch as the shafts 17 rest on the member 19 which forms part of the base portion 1 of the truck, said member 19 provides a fulcrum to said shafts, in which the pivotally connected ends 16 of said shafts relative to the lower cross member or bar 14 of the lazy tong mechanisms 8, will elevate said member 14, thereby causing said lazy tong mechanisms to effect upward movement to the platform 13, and when said platform has attained the desired height or level relative to the platform A of the truck, the elevating movement is stopped, and in which the platform 13 will be held in the desired position by engagement of one of the teeth 23 of the ratchet pawl 22 with the engaging member 21 which is carried by the shafts 17.

From the aforesaid description of operation, it is obvious that when it is desired to unload heavy articles from a vehicle platform, the platform of the truck will be first elevated to the desired level. For preventing the base portion 1 from tilting rearwardly when downward pressure is brought to bear on the handle 18, a cross sill 24 is provided against the underside of the side members 4 of the base member at the rear thereof.

If it is desired to construct a heavy duty truck containing this improvement in which the platform thereof will be quite large, two sets of lazy tong mechanisms, each having respective lifting bars or handles, such as the shafts 17, may be used in connection with the platform. The application of a lazy tong mechanism in connection with an operating lever as described may be used in conjunction with devices other than a truck.

What I claim is:

1. A hoisting device comprising a platform, a lazy-tong mechanism engaged beneath said platform, a lever fulcrumed beneath said platform intermediate of its ends having one end in engagement with the lower portion of said mechanism and a ratchet pawl for engagement with a part of said lever.

2. A truck having a base portion, a platform, a pair of lazy-tong devices mounted on said base portion beneath said platform, portions provided on said base portion whereby said platform will rest on said base portion when said platform is in its lowered position, an operating member extending between said base portion and said platform in engagement with said lazy tong devices for pushing and pulling said truck while in its position of engagement with said lazy tong devices, said operating member also providing means for actuating said lazy-tong devices, whereby said platform is either raised or lowered and a releasable catching member extending from said base portion for engagement with a portion of said operating member.

3. A truck having a base portion, a swivel roller carried by said base portion, a platform arranged above said base portion, a lifting mechanism coöperable with said platform comprised of a pair of lazy tongs, a centrally arranged cross bar for tying said lazy tongs together, a pair of shafts secured at one end to said bar and extending from between said base portion and said platform, and a stationarily held fulcrum arranged on said base portion upon which said shafts rest, said shafts adapted to operate said mechanism whereby said platform is elevated, automatic catching means coöperable with said shafts for holding said platform in elevated position, said shafts also providing means for propelling and steering said truck.

THEODORE G. THOMAS.